United States Patent
Chen et al.

(10) Patent No.: US 9,991,975 B2
(45) Date of Patent: Jun. 5, 2018

(54) METHOD AND DEVICE FOR TRIGGERING SPECIFIED OPERATION

(71) Applicant: Xiaomi Inc., Beijing (CN)

(72) Inventors: Hong Chen, Beijing (CN); Ziguang Gao, Beijing (CN); Enxing Hou, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days. days.

(21) Appl. No.: 15/059,986

(22) Filed: Mar. 3, 2016

(65) Prior Publication Data
US 2017/0033877 A1    Feb. 2, 2017

(30) Foreign Application Priority Data
Jul. 31, 2015    (CN) .......................... 2015 1 0463534

(51) Int. Cl.
| | |
|---|---|
| *H04B 17/309* | (2015.01) |
| *H04L 12/28* | (2006.01) |
| *H04W 24/10* | (2009.01) |
| *G05B 11/00* | (2006.01) |

(Continued)

(52) U.S. Cl.
CPC .......... *H04B 17/309* (2015.01); *G05B 11/00* (2013.01); *H04B 1/1027* (2013.01); *H04L 12/2803* (2013.01); *H04W 24/10* (2013.01); *H04B 17/318* (2015.01); *H04W 4/80* (2018.02)

(58) Field of Classification Search
CPC ... H04B 17/309; H04B 1/1027; H04W 24/10; H04W 4/008
See application file for complete search history.

(56) References Cited

U.S. PATENT DOCUMENTS

| | | | |
|---|---|---|---|
| 6,909,921 B1* | 6/2005 | Bilger | G05B 15/02 700/14 |
| 7,579,945 B1* | 8/2009 | Richter | G08B 25/14 340/286.14 |

(Continued)

FOREIGN PATENT DOCUMENTS

| | | |
|---|---|---|
| CN | 104283876 A | 1/2015 |
| CN | 104540103 A | 4/2015 |

(Continued)

OTHER PUBLICATIONS

Extended European Search Report (including English translation) issued in corresponding EP Application No. EP16164237, dated Dec. 14, 2016, 7 pages.

(Continued)

*Primary Examiner* — Liton Miah

(57) ABSTRACT

The present disclosure relates to a method and a device for triggering a specified operation, and belongs to the field of smart home technologies. The method includes obtaining a wireless signal received by a receiving device and sent by a specified signal source, determining whether a disturbance occurs in the first wireless signal, obtaining a signal quality characteristic of the wireless signal if it is determined that a disturbance occurs in the wireless signal; determining whether the signal quality characteristic matches with predetermined characteristic sample; and triggering the intelligent device to perform the specified operation if the signal quality characteristic matches with the predetermined characteristic sample.

21 Claims, 5 Drawing Sheets

(51) Int. Cl.
*H04B 1/10* (2006.01)
*H04B 17/318* (2015.01)

(56) References Cited

U.S. PATENT DOCUMENTS

| | | | |
|---|---|---|---|
| 2009/0182858 A1* | 7/2009 | Zhou | H04L 12/46 709/223 |
| 2010/0238036 A1* | 9/2010 | Holcombe | G08B 3/10 340/629 |
| 2011/0092164 A1 | 4/2011 | Spanhake | |
| 2011/0252132 A1* | 10/2011 | Wetzer | G06F 9/542 709/224 |
| 2012/0245890 A1 | 9/2012 | Wark et al. | |
| 2013/0310018 A1* | 11/2013 | Faenger | G06F 9/4856 455/420 |
| 2015/0347910 A1* | 12/2015 | Fadell | G05B 19/042 706/46 |

FOREIGN PATENT DOCUMENTS

| | | |
|---|---|---|
| CN | 104601204 A | 5/2015 |
| CN | 104678770 A | 6/2015 |
| CN | 104765349 A | 7/2015 |
| CN | 104796309 A | 7/2015 |
| JP | 2001229474 A | 8/2001 |
| JP | 2005338967 A | 12/2005 |
| JP | 2009163420 A | 7/2009 |
| RU | 130098 U1 | 7/2013 |
| WO | 2009114626 A2 | 9/2009 |
| WO | 2010111740 A1 | 10/2010 |

OTHER PUBLICATIONS

First Office Action (including English translation) issued in corresponding Chinese Patent Application No. 201510463534.2, dated May 31, 2017, 17 pages.
Search report of office action from Russian Patent Office for RU application 2016117386, dated Nov. 9, 2017, 2 pages.
English translation of International Search Report for PCT application CN2015090597, dated Apr. 27, 2016, 4 pages.
Office action from Japanese Patent Office for JP application 2016525500, dated Dec. 5, 2017, 7 pages.
Office action from Russian Patent Office for RU application 2016117386, dated Nov. 10, 2017, 5 pages.

* cited by examiner

METHOD AND DEVICE FOR TRIGGERING SPECIFIED OPERATION

CROSS-REFERENCE TO RELATED APPLICATIONS

This application is based upon and claims priority to Chinese Patent Application No. 201510463534.2, filed with the State Intellectual Property Office of P. R. China on Jul. 31, 2015, the entire contents of which are incorporated herein by reference.

TECHNICAL FIELD

The present disclosure relates to the field of smart home technologies, and more particularly, to a method and a device for triggering a specified operation.

BACKGROUND

The home automatization is one of core functions of the smart home system. Many intelligent household devices may trigger automatically some specified operations.

In the related art, in order to realize the automatic triggering of the specified operations, dedicated sensors may be disposed in the smart home system. When the sensor detects the predetermined condition, the related intelligent household device may be triggered to perform the specified operation. For example, taking the automatic control for turning on/off the lighting device as an example, an infrared sensor may be disposed at the gate of the room in advance, and when the infrared sensor detects that someone walks into the room, the lighting device in the room may be turned on automatically.

SUMMARY

Embodiments of the present disclosure provide a method and a device for triggering a specified operation. The technical solutions may be as follows.

According to a first aspect of embodiments of the present disclosure, a method for triggering an intelligent device to perform a specified operation includes obtaining a first wireless signal received by a receiving device and sent by a signal source, obtaining a signal quality characteristic of the first wireless signal if it is determined that a disturbance occurs in the first wireless signal, determining whether the signal quality characteristic matches with a predetermined characteristic sample, and triggering the intelligent device to perform the specified operation if the signal quality characteristic matches with the predetermined characteristic sample.

According to a second aspect of embodiments of the present disclosure, an apparatus for triggering a specified operation include a first obtaining module, configured to obtain a first signal quality of a first wireless signal received by a receiving device and sent by a signal source, a second obtaining module, configured to obtain a signal quality characteristic of the first signal quality if it is determined that a disturbance occurs in the first signal quality, a determining module configured to determine whether the signal quality characteristic matches with a predetermined characteristic sample, and a triggering module configured to trigger to perform the specified operation if the signal quality characteristic matches with the predetermined characteristic sample.

According to a third aspect of embodiments of the present disclosure, a device for triggering a specified operation include a processor and a memory for storing instructions executable by the processor. The processor is configured to obtain a first signal quality of a first wireless signal received by a receiving device and sent by a signal source, obtain a signal quality characteristic of the first signal quality if it is determined that a disturbance occurs in the first signal quality, determine whether the signal quality characteristic matches with a predetermined characteristic sample, and trigger to perform the specified operation if the signal quality characteristic matches with the predetermined characteristic sample.

According to a fourth aspect of embodiments of the present disclosure, a system for triggering a specified operation includes a receiving device, a specified signal source and a device for triggering a specified operation. The device for triggering a specified operation is a part of the receiving device, or the device for triggering a specified operation is a device separate from the receiving device.

The technical solutions provided in embodiments of the present disclosure may have advantageous effects as follows.

By obtaining the first signal quality of the first wireless signal received by the receiving device and sent by the specified signal source, obtaining the signal quality characteristic of the first signal quality if it is determined that the disturbance occurs in the first signal quality, determining whether the signal quality characteristic matches with the predetermined characteristic sample, and triggering to perform the specified operation if the signal quality characteristic matches with the predetermined characteristic sample, the specified operation is triggered to perform after determining that there is someone or something passing through based on the disturbance occurring in the first signal quality of the first wireless signal received by the receiving device and sent by the specified signal source, so that the effect of expanding application scenarios of the wireless communication technology is achieved.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the invention. Instead, they are merely examples of apparatuses and methods consistent with aspects related to the invention as recited in the appended claims.

Figure 1:
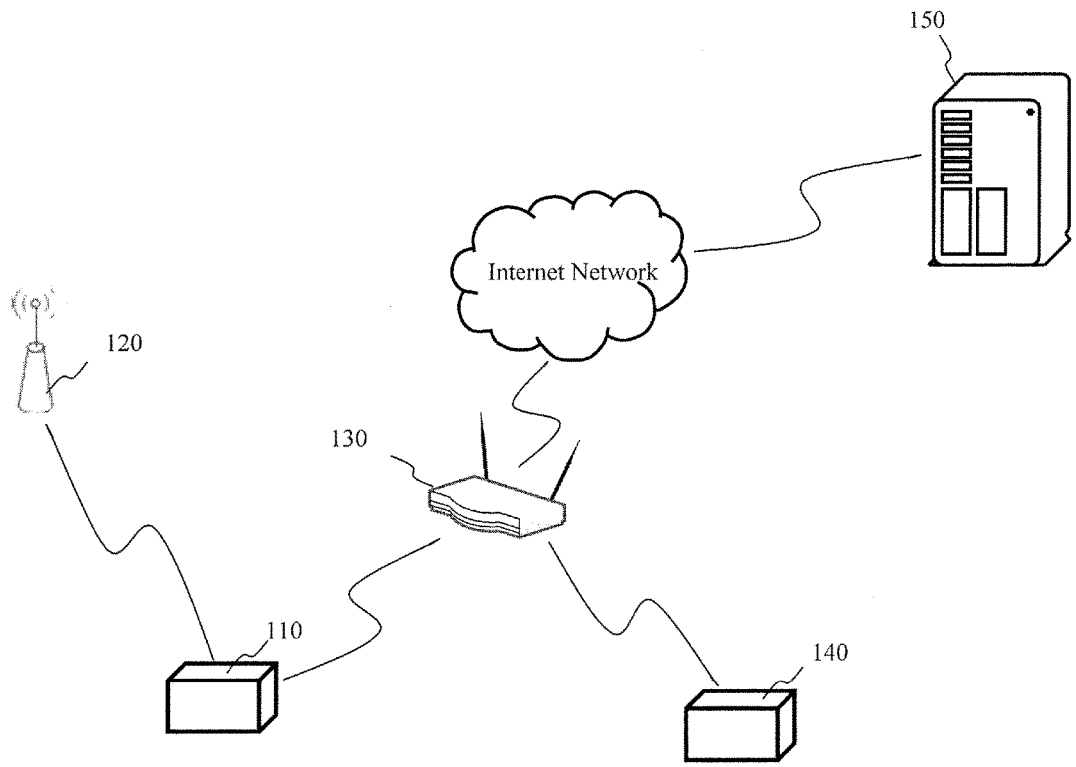
FIG. 1 is a schematic diagram illustrating an implementing environment related to a method for triggering a specified operation according to some example embodiments.

FIG. 1 is a schematic diagram illustrating an implementing environment related to a method for triggering a specified operation according to some example embodiments of the present disclosure. This implementing environment includes a receiving device 110, a signal source 120, a control device 130 and an intelligent household device 140.

The receiving device 110 and the signal source 120 both support at least one wireless communication technology, for example, Wi-Fi (Wireless Fidelity) technology.

The receiving device 110 and the intelligent household device 140 are connected respectively with the control device 130 via a wired or wireless way.

In a possible implementation, any two of the receiving device 110, the control device 130 and the intelligent household device 140 may be the same kind of device. Or, in another possible implementation, the receiving device 110, the control device 130 and the intelligent household device 140 may be the same kind of device.

Alternatively, the implementing environment further includes a server 150. The server 150 may be one server, or a server cluster composed of a plurality of servers, or a cloud computing service center. The server 150 is connected with the control device 130 via the Internet Network.

In the implementing environment shown in FIG. 1, positions of the signal source 120 and the receiving device 110 are fixed, and a wireless signal emitted by the signal source 120 forms a wireless signal field covering the receiving device 110. The signal source 120 may transmit a broadcast message or a point-to-point message via the wireless signal field, and each message may carry a device identification of the signal source 120, for example, MAC (Media Access Control) address. The receiving device 110 may identify the signal source 120 according to the device identification, and calculate the signal quality of the received wireless signal sent by the signal source 120. When there is no obstruction or a stationary obstruction between the signal source 120 and the receiving device 110, the wireless signal field between the signal source 120 and the receiving device 110 tends to be stable and the signal quality of the wireless signal received by the receiving device 110 and sent by the signal source 120 is less vulnerable to fluctuations. When someone or something passes through between the signal source 120 and the receiving device 110, the wireless signal emitted by the signal source 120 may be obstructed, thereby resulting in a disturbance occurring in the wireless signal field between the signal source 120 and the receiving device 110 and further resulting in the disturbance occurring in the signal quality of the wireless signal received by the receiving device 110 and sent by the signal source 120. The technical solutions according to various embodiments of the present disclosure exactly detect whether the disturbance occurs in the wireless signal field between the signal source 120 and the receiving device 110 based on the signal quality of the wireless signal received by the receiving device 110 and sent by the signal source 120, further determine whether there is someone or something passing through between the signal source 120 and the receiving device 110 and take this as a triggering condition of the specified operation.

When different objects of different volumes pass through between the signal source 120 and the receiving device 110, effects on the wireless signal field may be varied, thereby resulting in different disturbances occurring in the signal quality of the wireless signal received the receiving device 110 and sent by the signal source 120. Thus it may be determined whether someone/something passing through may trigger the specified operation based on the disturbance occurring in the signal quality of the wireless signal.

Figure 2:
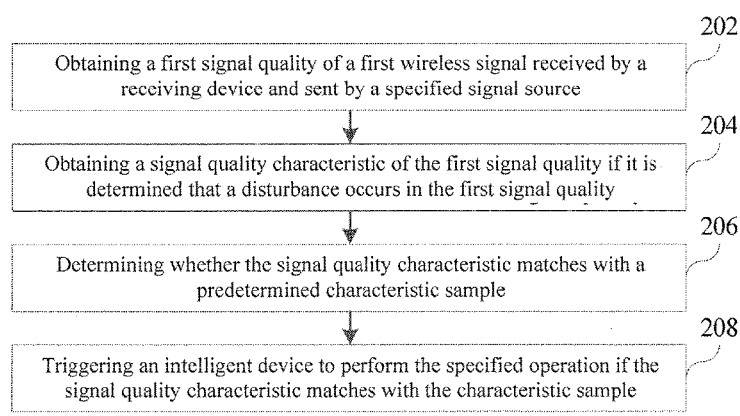
FIG. 2 is a flow chart showing a method for triggering a specified operation according to an example embodiment.

FIG. 2 is a flow chart showing a method for triggering a specified operation according to an example embodiment. The method for triggering a specified operation may be applied to the control device 130 or the server 150 of the implementing environment shown in FIG. 1. As shown in FIG. 2, the method for triggering a specified operation may include following steps.

In step 202, a first signal quality of a first wireless signal received by a receiving device and sent by a specified signal source is obtained. In step 204, a signal quality characteristic of the first signal quality is obtained if it is determined that a disturbance occurs in the first signal quality. In step 206, it is determined whether the signal quality characteristic matches with a predetermined characteristic sample. In step 208, the specified operation is triggered to perform if the signal quality characteristic matches with the predetermined characteristic sample.

Alternatively, before the first signal quality of the first wireless signal received by the receiving device and sent by the specified signal source is obtained, the method further includes following steps: obtaining a second signal quality of a second wireless signal sent by the specified signal source and received by the receiving device during a sample setting period, in which the sample setting period is a period of time specified to set the predetermined characteristic sample, generating a signal quality characteristic spectrum according to the second signal quality of the second wireless signal sent by the specified signal source and received by the receiving device during the sample setting period, in which the signal quality characteristic spectrum is configured to indicate a signal quality corresponding to each time during the sample setting period, analyzing the signal quality characteristic spectrum to get an analysis result, and setting the predetermined characteristic sample according to the analysis result.

Alternatively, the sample setting period is a period of time with a first time as a start time and a predetermined length, or the sample setting period is a period of time with a first time as a start time and a second time as an end time, in which the first time is a time of receiving an operation for starting to set the predetermined characteristic sample, and the second time is a time of receiving an operation for stopping setting the predetermined characteristic sample.

Alternatively, triggering to perform the specified operation includes searching for the specified operation and an intelligent household device for performing the specified operation according to the predetermined characteristic sample, and triggering the intelligent household device to perform the specified operation.

Alternatively, the receiving device includes two or more signal receivers and triggering to perform the specified operation includes determining an order of disturbances occurring in the first signal quality of wireless signals received by the two or more signal receivers, searching for the specified operation and an intelligent household device for performing the specified operation according to the order and the predetermined characteristic sample, and triggering the intelligent household device to perform the specified operation.

Alternatively, the specified signal source includes two or more signal sources disposed adjacent to each other and obtaining a signal quality characteristic of the first signal quality includes obtaining the signal quality characteristics of the first signal quality of wireless signals received by the receiving device and sent by the two or more signal sources if it is determined that the disturbances occur simultaneously in the first signal quality of the wireless signals received by the receiving device and sent by the two or more signal sources.

In summary, by obtaining the first signal quality of the first wireless signal received by the receiving device and sent by the specified signal source, obtaining the signal quality characteristic of the first signal quality if it is determined that the disturbance occurs in the first signal quality, determining whether the signal quality characteristic matches with the predetermined characteristic sample, and triggering to perform the specified operation if the signal quality characteristic matches with the predetermined characteristic sample, the method for triggering a specified operation according to embodiments of the present disclosure may trigger the specified operation to be performed after determining that someone or something passes through based on the disturbance occurring in the first signal quality of the first wireless signal received by the receiving device and sent by the specified signal source, so that the effect of expanding application scenarios of the wireless communication technology is achieved.

All of the method according to the above embodiment of the present disclosure may be performed by the control device 130 in the implementing environment shown in FIG. 1, or may be performed by the server 150, or may be performed by the control device 130 partly and by the server 150 partly. In the following embodiments of the present disclosure, take the server 150 performing the above method as an example to explain.

Figure 3A:
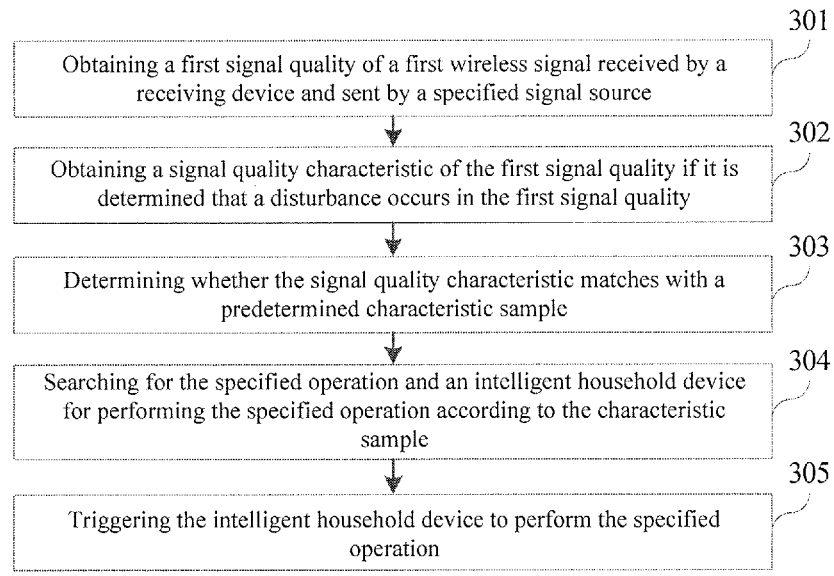
FIG. 3A is a flow chart showing a method for triggering a specified operation according to another example embodiment.

FIG. 3A is a flow chart showing a method for triggering a specified operation according to another example embodiment. The method for triggering a specified operation may be applied to the server 150 of the implementing environment shown in FIG. 1. As shown in FIG. 3A, the method for triggering a specified operation may include following steps.

In step 301, a first signal quality of a first wireless signal received by a receiving device and sent by a specified signal source is obtained. In an embodiment of the present disclosure, the first signal quality of the first wireless signal may be represented by RSSI (Receive Signal Strength Indicator) value.

In step 302, a signal quality characteristic of the first signal quality is obtained if it is determined that a disturbance occurs in the first signal quality.

Alternatively, when determining whether the disturbance occurs in the first signal quality, it may be determined whether the first signal quality is within a predetermined signal quality range during a certain period, and if yes, it is indicated that the disturbance occurs in the first signal quality, and then the signal quality characteristic of the first signal quality is obtained.

The characteristic of the wireless signal disturbance caused by someone/something passing through between the receiving device and the specified signal source may be that, the signal quality of the wireless signal may change a lot within a short period and this change remains for a short duration. Therefore, the technical solutions provided in embodiments of the present disclosure determines that the disturbance occurs in the first signal quality only when determining that the first signal quality is within the predetermined signal quality range during the certain period.

Alternatively, the specified signal source may include one signal source, or the specified signal source may include two or more signal sources disposed adjacent to each other. For example, the signal source may be multiple sources such as adjacently positioned antennas set apart at a fixed distance from one another. The multiple sources such as adjacently positioned antennas may be integrated to a single device. If the specified signal source includes the two or more signal sources disposed adjacent to each other, the step of obtaining signal quality characteristics of the first signal quality of the wireless signals received by the receiving device and sent by the two or more signal sources is performed only when determining that the disturbances occur simultaneously in the first signal quality of the wireless signals received by the receiving device and sent by the two or more signal sources.

In practice, when there is no someone/something passing through between the specified signal source and the receiving device, a disturbance may occur in the first signal quality caused by a failure of the specified signal source, thereby resulting in a false detection. In order to avoid this situation as much as possible, the specified signal source may include two or more signal sources, and the two or more signal sources are disposed adjacent to each other and send the wireless signals at the same power, so that covering conditions of the wireless signal fields in space are identical. At some moment, if the disturbance occurs in the first signal quality of the first wireless signal received by the receiving device and sent by one signal source, but no disturbance occurs in the first signal quality of the wireless signals received by the receiving device and sent by other signal sources, it is indicated that the wireless signal disturbance may be caused by the failure of the signal source, such that no process for performing a specified operation is required. The signal quality characteristics of the first signal quality of the wireless signals received by the receiving device and sent by the two or more signal sources may be obtained only when it is determined that the disturbances occur simultaneously in the first signal quality of the wireless signals received by the receiving device and sent by the two or more signal sources.

In step 303, it is determined whether the signal quality characteristic matches with a predetermined characteristic sample.

The signal quality characteristic may include at least one of a minimum signal quality, an average signal quality and a disturbance duration.

The receiving device receives and calculates a signal strength of the first wireless signal sent by the specified signal source and sends the signal strength to the server in real time. The server determines that the disturbance occurs in the first signal quality of the first wireless signal received by the receiving device and sent by the specified signal source if the signal strength is less than 0 dBm (decibelmilliwatt) at one moment, and then extracts the minimum signal quality, the average signal quality and the disturbance duration in this disturbance process. For example, if the minimum signal quality is within a range of [−75 dBm, −65 dBm], the average signal quality is within a range of [−10 dBm, 0 dBm] and the disturbance duration is within a range of [1.5 s, 3.5 s], it is determined that the signal quality characteristic matches with the predetermined characteristic sample.

In step 304, the specified operation and an intelligent household device for performing the specified operation are searched for according to the predetermined characteristic sample.

In step 305, the intelligent household device is triggered to perform the specified operation.

The smart home may be provided with many detection systems, configured to control different intelligent household devices to perform different specified operations, in which each detection system is provided with a receiving device and a specific signal source. For example, the detection system disposed in front of the gate of home is configured to control the security and protection system to turn on the video surveillance or to alarm. In other example, the detection system disposed at the gate of the bedroom is configured to control the bedroom lighting device to be turned on/off, etc. The correspondence relationship between the predetermined characteristic sample and the combination of the specified operation and the identification of the intelligent household device for performing the specified operation may be pre-stored in the server. When detecting that there is someone/something passing through between the receiving device and the specified signal source in one detection system, the server searches for the specified operation and the intelligent household device for performing the specified operation according to the corresponding characteristic sample, and then sends a control instruction to the intelligent household device so as to control the intelligent household device to perform the specified operation.

In the above technical solutions of embodiments of the present disclosure, only take the receiving device receiving the wireless signal sent by the specified signal source via a single receiver as an example to explain. Alternatively, in another possible implementation of embodiments of the present disclosure, the receiving device may include two or more signal receivers. When triggering to perform the specified operation, an order of the disturbances occurring in the first signal quality of the wireless signals received by the two or more signal receivers may be determined, and then the specified operation and the intelligent household device for performing the specified operation may be searched for according to the order and the predetermined characteristic samples, and then the intelligent household device is triggered to perform the specified operation.

Figure 3B:
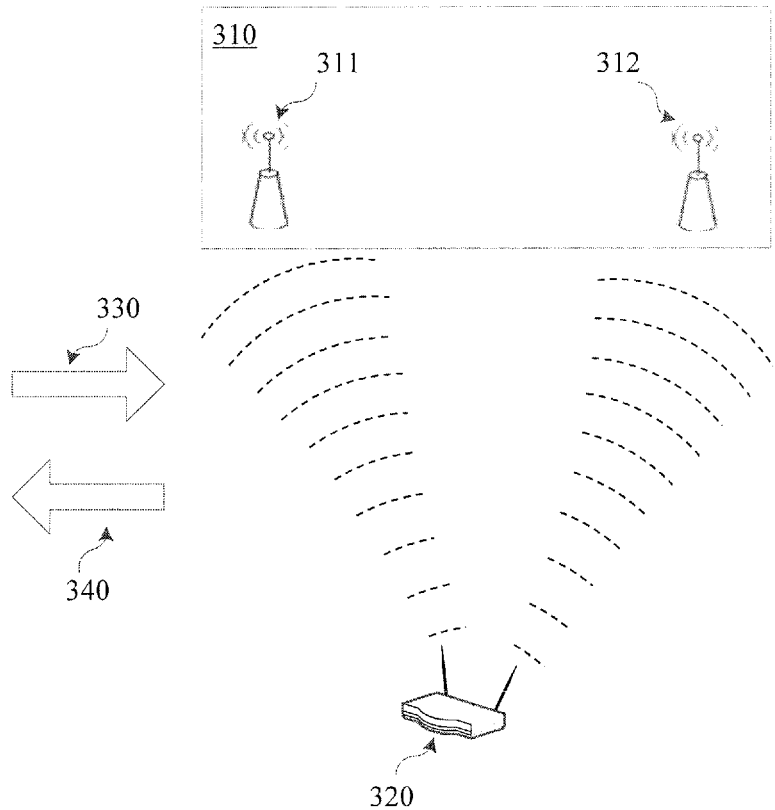
FIG. 3B is a schematic diagram illustrating a receiving device and a specified signal source according to another example embodiment.

For example, FIG. 3B is a schematic diagram illustrating a receiving device and a specified signal source according to an example embodiment, in which the receiving device 310 at least includes a first signal receiver 311 and a second signal receiver 312. The first signal receiver 311, the second signal receiver 312 and the specified signal source 320 are not in the same line. When the disturbance occurring in the first signal quality of the first wireless signal received by the first signal receiver 311 is prior to the disturbance occurring in the first signal quality of the first wireless signal received by the second signal receiver 312, it may be determined that there is someone/something passing through between the receiving device 310 and the specified signal source 320 along a direction indicated by the arrow 330. Conversely, when the disturbance occurring in the first signal quality of the first wireless signal received by the first signal receiver 311 is posterior to the disturbance occurring in the first signal quality of the first wireless signal received by the second signal receiver 312, it may be determined that there is someone/something passing through between the receiving device 310 and the specified signal source 320 along a direction indicated by the arrow 340. The server may determine different specified operations by combining with the directions along which someone/something passes through, for example, according to different directions, specified operations of turning on the intelligent device or turning off the lighting device are determined respectively.

It should be noted that, in the technical solutions provided by embodiments of the present disclosure, all of the above steps are accomplished by the server. In practice, the above steps may be accomplished without a server, but by the control device in the smart home, for example, a smart router. Alternatively, the above steps may also be accomplished by the cooperation of the server and the control device, for example, the above steps 301-303 may be accomplished by the server and the above steps 304-308 may be accomplished by the control device.

In summary, by obtaining the first signal quality of the first wireless signal received by the receiving device and sent by the specified signal source, obtaining the signal quality characteristic of the first signal quality if it is determined that the disturbance occurs in the first signal quality, determining whether the signal quality characteristic matches with the predetermined characteristic sample, and triggering an intelligent device to perform the specified operation if the signal quality characteristic matches with the predetermined characteristic sample, the method for triggering a specified operation according to embodiments of the present disclosure may trigger the specified operation to be performed after determining that there is someone or something passing through based on the disturbance occurring in the first signal quality of the first wireless signal received by the receiving device and sent by the specified signal source, so that the effect of expanding application scenarios of the wireless communication technology is achieved.

In the above embodiments of the present disclosure, the predetermined characteristic sample may be a sample which is set uniformly and stored by a developer in advance based on a possible scenario arising in the actual application, i.e. the developer may set one or more characteristic samples according to the disturbances of the signal quality due to someone/something who meets the triggering conditions passing through between the receiving device and the specified signal source in the variety of possible scenarios, and then the one or more characteristic samples are stored in related devices. An identical characteristic sample may be set to correspond to all scenarios; or different characteristic samples may be set to correspond to different scenarios, and then the user may select corresponding scenarios and characteristic samples according to the actual applications after system is set up.

Or, the predetermined characteristic sample may be set by the user according to the actual application environment before the above step 301. Setting by the user the predetermined characteristic sample corresponding to one specified operation will be illustrated in an embodiment of the present disclosure shown in FIG. 4A.

Figure 4A:
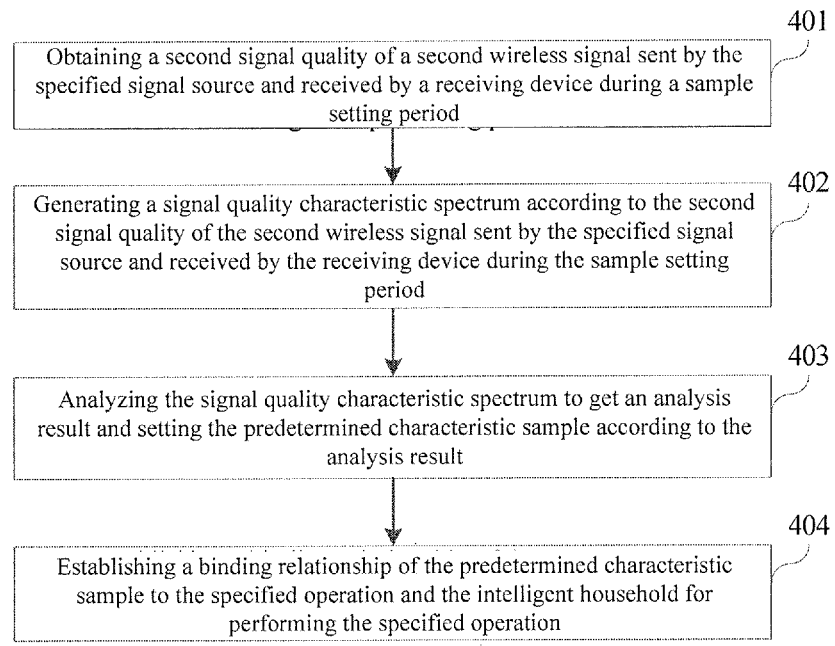
FIG. 4A is a flow chart showing a method for setting a sample according to a further example embodiment.

Referring to FIG. 4A, which is a flow chart showing a method for setting a sample according to an example embodiment, this method may be used for setting the predetermined characteristic sample before above step 301 shown in FIG. 3 and the method may include following steps.

In step 401, a second signal quality of a second wireless signal sent by the specified signal source and received by the receiving device during a sample setting period is obtained. The sample setting period is a period of time specified to set the predetermined characteristic sample. Alternatively, the sample setting period is a period of time with a first time as a start time and a predetermined length. Or the sample setting period is a period of time with a first time as a start time and a second time as an end time.

The first time is a time of receiving an operation for starting to set the predetermined characteristic sample, and the second time is a time of receiving an operation for stopping setting the predetermined characteristic sample.

In step 402, a signal quality characteristic spectrum is generated according to the second signal quality of the second wireless signal sent by the specified signal source and received by the receiving device during the sample setting period. The signal quality characteristic spectrum is configured to indicate signal quality corresponding to each time during the sample setting period.

In step 403, the signal quality characteristic spectrum is analyzed to get an analysis result and the predetermined characteristic sample is set according to the analysis result.

In step 404, a binding relationship of the predetermined characteristic sample to the specified operation and the intelligent household device for performing the specified operation is established.

After implementing the implementing environment shown in FIG. 1, the user firstly sets the predetermined characteristic sample of the disturbance resulting in a reduction in the signal quality within a short period when there is someone/something passing through between the receiving device and the specified signal source, and this setting process may be illustrated as follows.

1. The user issues an initialization instruction via the control device, and then the user passes through between the receiving device and the signal source. In order to improve the accuracy of the predetermined characteristic sample, the user may go through repeatedly between the receiving device and the signal source during this process.

2. After the user issues the initialization instruction via the control device, the receiving device enters the sample setting period, and receives a wireless signal sent by the signal source during the sample setting period and calculates a signal quality of the wireless signal, and sends the signal quality to the server. This specified period is a period of time from the first time when the user issues the initialization instruction via the control device to the second time when the user issues the initialization ending instruction via the control device, or this specified period is a period of time with a fixed length after the user issues the initialization instruction via the control device, for example, 1 minute.

3. After receiving the signal quality, the server generates the signal quality characteristic spectrum corresponding to the signal quality.

4. The server analyzes the signal quality characteristic spectrum to get the analysis result, and then sets the predetermined characteristic sample according to the analysis result.

Figure 4B:
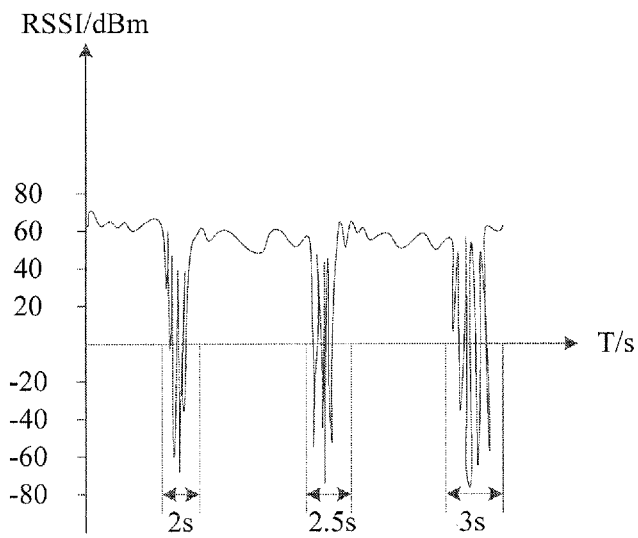
FIG. 4B is a schematic diagram illustrating a signal quality characteristic spectrum according to a further example embodiment.

The signal quality characteristic spectrum may be shown in FIG. 4B, in which X axis represents a time and Y axis represents a RSSI value of the wireless signal received by the receiving device and sent by the specified signal source. Take setting data including a minimum signal quality range, the average signal quality range and the disturbance duration range in the predetermined characteristic sample as an example. As shown in FIG. 4B, when no disturbance occurs, the RSSI value of the wireless signal is close to 60 dBm, and then there are 3 disturbances occurring in the RSSI value of the wireless signal, the durations of which are 2 s, 2.5 s and 3 s respectively, the minimum values of RSSI are −68 dBm, −70 dBm and −72 dBm respectively. And after calculations, average values of RSSI are obtained, which are −5 dBm, −6 dBm and −7 dBm corresponding respectively to 3 disturbances. When setting the predetermined characteristic sample, the ranges of the above data may be appropriately relaxed, for example, the value range of minimum signal quality in the predetermined characteristic sample is [−75 dBm, −65 dBm], the value range of average signal quality in the predetermined characteristic sample is [−10 dBm, 0 dBm] and the value range of disturbance duration in the predetermined characteristic sample is [1.5 s, 3.5 s].

5. In the initialization instruction issued by the user via the control device, the specified operation and the identification of the intelligent device for performing the specified operation may be carried. After the server sets the predetermined characteristic sample, the correspondence relationship of the predetermined characteristic sample to the specified operation and the identification of the intelligent device for performing the specified operation is established.

Alternatively, when the receiving device includes the two or more signal receivers, the server sets the predetermined characteristic sample respectively for each signal receiver and records the order of the disturbances occurring in the signal quality of the wireless signals received by each signal receiver, and establishes the correspondence relationships of the predetermined characteristic samples corresponding to the signal receivers, the order of the disturbances occurring in the signal quality of the wireless signals received by each signal receivers, the specified operations and the identifications of the intelligent devices for performing the specified operations.

Alternatively, in the technical solutions provided by embodiments of the present disclosure, the range of the disturbance occurring in the signal quality may be set according to the above signal quality characteristic spectrum, i.e. only when it is determined that the first signal quality is within the judgment range in step 304 shown in FIG. 3, the disturbance is considered to occur in the first signal quality.

In summary, the method for setting a sample according to embodiments of the present disclosure obtains the second signal quality of the second wireless signal sent by the specified signal source and received by the receiving device during the specified period, generates the signal quality characteristic spectrum according to the second signal quality of the second wireless signal sent by the specified signal source and received by the receiving device during the specified period, analyzes the signal quality characteristic spectrum to get the analysis result and sets the predetermined characteristic sample according to the analysis result, and subsequently, obtains the signal quality characteristic of the first signal quality of a first wireless signal when the disturbance occurs in the first signal quality, and performs the step of triggering to perform the specified operation if it is determined that the signal quality characteristic matches with the predetermined characteristic sample. In this way, the detection condition is close to the actual application environment of the user, such that the detection accuracy is improved.

The following device embodiments of the present disclosure may be used to perform the method embodiments of the present disclosure. For details not disclosed in the device embodiments of the present disclosure, reference is made to the method embodiments of the present disclosure.

Figure 5:
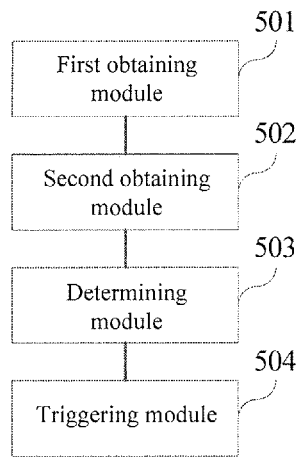
FIG. 5 is a block diagram showing a device for triggering a specified operation according to an example embodiment.

FIG. 5 is a block diagram showing a device for triggering a specified operation according to an example embodiment, and the device for triggering a specified operation may be applied to the control device 130 and/or the server 150 of the implementing environment shown in FIG. 1, so as to perform the method shown in any one of FIG. 2, 3A or 4A. As shown in FIG. 5, the device for triggering a specified operation includes but is not limited to a first obtaining module 501, a second obtaining module 502, a detecting module 503 and a triggering module 504.

The first obtaining module 501 is configured to obtain a first signal quality of a first wireless signal received by a receiving device and sent by a specified signal source.

The second obtaining module 502 is configured to obtain a signal quality characteristic of the first signal quality if it is determined that a disturbance occurs in the first signal quality.

The determining module 503 is configured to determine whether the signal quality characteristic matches with a predetermined characteristic sample.

The triggering module 504 is configured to trigger an intelligent device to perform the specified operation if the signal quality characteristic matches with the predetermined characteristic sample.

In summary, by obtaining the first signal quality of the first wireless signal received by the receiving device and sent by the specified signal source, obtaining the signal quality characteristic of the first signal quality if it is determined that the disturbance occurs in the first signal quality, determining whether the signal quality characteristic matches with the predetermined characteristic sample, and triggering to perform the specified operation if the signal quality characteristic matches with the predetermined characteristic sample, the device for triggering a specified operation according to embodiments of the present disclosure may trigger the specified operation to be performed after determining that there is someone or something passing through based on the disturbance occurring in the signal quality of the first wireless signal received by the receiving device and sent by the specified signal source, so that realize the effect of expanding application scenarios of the wireless communication technology is achieved.

Figure 6:
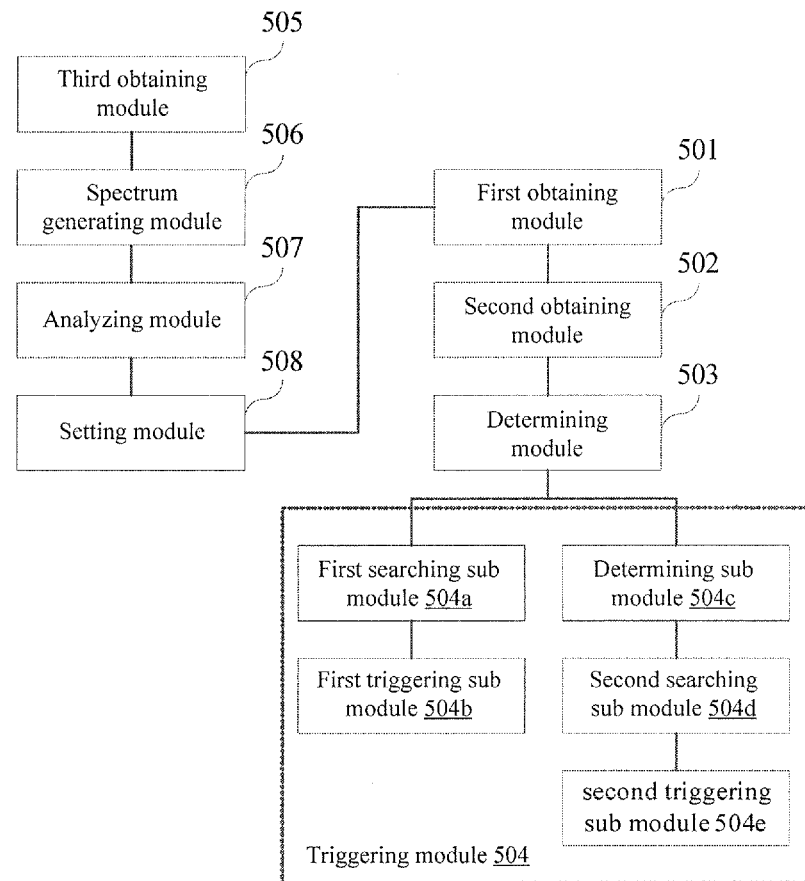
FIG. 6 is a block diagram showing a device for triggering a specified operation according to another example embodiment.

FIG. 6 is a block diagram showing a device for triggering a specified operation according to an example embodiment, and the device for triggering a specified operation may be applied to the control device 130 and/or the server 150 of the implementing environment shown in FIG. 1, so as to perform the method shown in any one of FIG. 2, 3A or 4A. As shown in FIG. 6, the device for triggering a specified operation includes but is not limited to a first obtaining module 501, a second obtaining module 502, a determining module 503 and a triggering module 504.

The first obtaining module 501 is configured to obtain a first signal quality of a first wireless signal received by a receiving device and sent by a specified signal source.

The second obtaining module 502 is configured to obtain a signal quality characteristic of the first signal quality if it is determined that a disturbance occurs in the first signal quality.

The determining module 503 is configured to determine whether the signal quality characteristic matches with a predetermined characteristic sample.

The triggering module 504 is configured to trigger to perform the specified operation if the signal quality characteristic matches with the predetermined characteristic sample.

Alternatively, the device further includes a third obtaining module 505, a spectrum generating module 506, an analyzing module 507 and a setting module 508.

The third obtaining module 505 is configured to obtain a second signal quality of a second wireless signal sent by the specified signal source and received by the receiving device during a sample setting period before the first obtaining module 501 obtains the first signal quality of the first wireless signal received by the receiving device and sent by the specified signal source. The sample setting period is a period of time specified to set the predetermined characteristic sample.

The spectrum generating module 506 is configured to generate a signal quality characteristic spectrum according to the second signal quality of the second wireless signal sent by the specified signal source and received by the receiving device during the sample setting period. The signal quality characteristic spectrum is configured to indicate a signal quality corresponding to each time during the sample setting period.

The analyzing module 507 is configured to analyze the signal quality characteristic spectrum to get an analysis result.

The setting module 508 is configured to set the predetermined characteristic sample according to the analysis result.

Alternatively, the sample setting period is a period of time with a first time as a start time and a predetermined length, or the sample setting period is a period of time with a first time as a start time and a second time as an end time. The first time is a time of receiving an operation for starting to set the predetermined characteristic sample, and the second time is a time of receiving an operation for stopping setting the predetermined characteristic sample.

Alternatively, the triggering module 504 includes a first searching sub module 504a and a first triggering sub module 504b. The first searching sub module 504a is configured to search for the specified operation and an intelligent household device for performing the specified operation according to the predetermined characteristic sample. The first triggering sub module 504b is configured to trigger the intelligent household device to perform the specified operation.

Alternatively, the receiving device includes two or more signal receivers and the triggering module 504 includes a determining sub module 504c, a second searching sub module 504d and a second triggering sub module 504e.

The determining sub module 504c is configured to determine an order of disturbances occurring in the first signal quality of wireless signals received by the two or more signal receivers before triggering to perform the specified operation. The second searching sub module 504d is configured to search for the specified operation and an intelligent household device for performing the specified operation according to the order and the predetermined characteristic sample. The second triggering sub module 504e is configured to trigger the intelligent household device to perform the specified operation.

Alternatively, the specified signal source includes two or more signal sources disposed adjacent to each other, and the second obtaining module 502 is further configured to obtain the signal quality characteristics of the first signal quality of wireless signals received by the receiving device and sent by the two or more signal sources if it is determined that the disturbances occur simultaneously in the first signal quality of the wireless signals received by the receiving device and sent by the two or more signal sources.

In summary, by obtaining the first signal quality of the first wireless signal received by the receiving device and sent by the specified signal source, obtaining the signal quality characteristic of the first signal quality if it is determined that the disturbance occurs in the first signal quality, determining whether the signal quality characteristic matches with the predetermined characteristic sample, and triggering to perform the specified operation if the signal quality characteristic matches with the predetermined characteristic sample, the device for triggering a specified operation according to embodiments of the present disclosure may trigger the specified operation to be performed after determining that there is someone or something passing through based on the disturbance occurring in the first signal quality of the first wireless signal received by the receiving device and sent by the specified signal source, so that the effect of expanding application scenarios of the wireless communication technology is achieved.

In addition, the device for triggering a specified operation according to embodiments of the present disclosure, obtains the second signal quality of the second wireless signal sent by the specified signal source and received by the receiving device during the specified period, generates the signal quality characteristic spectrum according to the second signal quality of the second wireless signal sent by the specified signal source and received by the receiving device during the specified period, analyzes the signal quality characteristic spectrum to get the analysis result and sets the predetermined characteristic sample according to the analysis result, and subsequently, obtains the signal quality characteristic of the first signal quality when the disturbance occurs in the first signal quality, and performs the step of triggering an intelligent device to perform the specified operation if it is determined that the signal quality characteristic matches with the predetermined characteristic sample. In this way, the detection condition is close to the actual application environment of the user, such that the detection accuracy is further improved.

Figure 7:
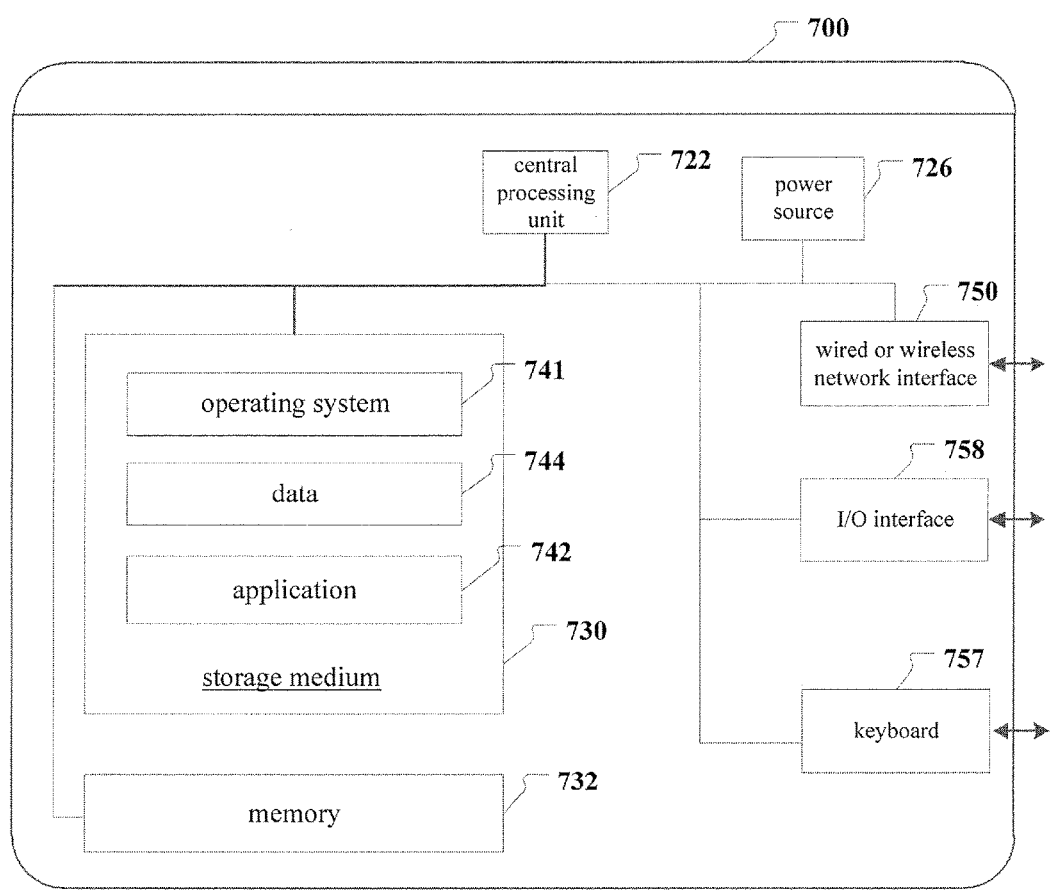
FIG. 7 is a block diagram showing a device according to an example embodiment.

FIG. 7 is a block diagram showing a device 700 according to an example embodiment. The device 700 may have a relatively large difference due to different configurations and properties, which may include one or more central processing units (CPUs) 722 (e.g., one or more processors), a memory 732, one or more storage mediums 730 for storing applications 742 or data 744. The memory 732 and the storage medium 730 may be a transitory storage memory or a non-transitory storage memory. The programs stored in the storage medium 730 may include one or more modules (not shown), each module may include a series of instruction operations, and the series of instruction operations may be configured to implement all or part of the steps of the method shown in FIG. 2 or FIG. 3. Furthermore, the central processing unit 722 is configured to communicate with the storage medium 730 to perform the series of instruction operations stored in the storage medium 730 on the device 700. The device 700 may also include one or more power sources 726, one or more wired or wireless network interfaces 750, one or more input-output (I/O) interfaces 758, one or more keyboards 757, and/or, one or more operating systems 741, for example, Windows Server™, Mac OS X™, Unix, Linux, FreeBSD™, etc.

Each module, such as those discussed with respect to FIGS. 5 and 6, may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

With respect to the devices in the above embodiments, the specific manners for performing operations for individual modules therein have been described in detail in the embodiments regarding the methods, which are not elaborated herein again.

In an embodiment of the present disclosure, a system for triggering a specified operation is provided, and this system includes a receiving device, a specified signal source and the device for triggering a specified operation according to the above second or third aspect of embodiments of the present disclosure. The receiving device may be the receiving device 110 in the implementing environment shown in FIG. 1 and the specified signal source may be the signal source 120 in the implementing environment shown in FIG. 1.

The device for triggering a specified operation is a portion of the receiving device, or the device for triggering a specified operation is a device separate from the receiving device, for example, the device for triggering a specified operation may be realized as the portion of the control device 130 or the server 150 in the implementing environment shown in FIG. 1.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:
1. A method, comprising:
obtaining a first wireless signal received by a receiving device and sent by a signal source, the first wireless signal being transmitted by the signal source via a wireless signal field and in a form of a broadcast message or a point-to-point message that carries an identification including media access control address of the signal source;
calculating a first signal quality of the first wireless signal;
determining whether the first signal quality of the first wireless signal is within a predetermined signal quality range during a certain period;
obtaining a signal quality characteristic of the first wireless signal if it is determined that the first signal quality of the first wireless signal is within the predetermined signal quality range during the certain period;
determining whether the signal quality characteristic matches with a predetermined characteristic sample; and
triggering an intelligent device to perform a specified operation if the signal quality characteristic matches with the predetermined characteristic sample based on a correspondence relationship between the predetermined characteristic sample and a combination of the specified operation and the identification that identifies the intelligent device.

2. The method according to claim 1, wherein before obtaining a first wireless signal received by a receiving device and sent by a specified signal source, the method further comprises:
obtaining a second wireless signal sent by the signal source and received by the receiving device during a sample setting period;

generating a signal quality characteristic spectrum based on the second wireless signal during the sample setting period, wherein the signal quality characteristic spectrum is configured to indicate a signal quality of the second wireless signal during the sample setting period; and setting the predetermined characteristic sample based on the signal quality characteristic spectrum.

3. The method according to claim 2,
wherein the sample setting period is a period of time with a first time as a start time and a predetermined length, and the first time is a time of receiving an operation for starting to set the predetermined characteristic sample.

4. The method of according to claim 2,
wherein the sample setting period is a period of time with a first time as a start time and a second time as an end time; and
wherein the first time is a time of receiving an operation for starting to set the predetermined characteristic sample, and the second time is a time of receiving an operation for stopping setting the predetermined characteristic sample.

5. The method according to claim 1, wherein triggering the intelligent device to perform the specified operation comprises:
searching for the specified operation and the intelligent device for performing the specified operation based on the predetermined characteristic sample; and
sending a triggering signal for the intelligent device to perform the specified operation.

6. The method according to claim 1, wherein triggering the intelligent device to perform the specified operations comprises:
sending a wireless triggering signal for the intelligent device to perform the specified operation.

7. The method according to claim 1, wherein the signal source comprises two or more signal sources disposed adjacent to each other and obtaining a signal quality characteristic of the first wireless signal comprises:
obtaining signal quality characteristics of wireless signals received by the receiving device and sent by the two or more signal sources if it is determined that disturbances occur simultaneously in the wireless signals received by the receiving device and sent by the two or more signal sources.

8. The method according to claim 1, wherein the signal quality characteristic includes at least one of a minimum signal quality, an average signal quality and a disturbance duration.

9. The method according to claim 1, wherein determining whether a disturbance occurs in the first wireless signal comprises:
determining whether the first wireless signal is within a predetermined signal quality range during a certain period.

10. The method according to claim 1, wherein the receiving device comprises two or more signal receivers and triggering the intelligent device to perform the specified operation comprises:
determining an order of disturbances occurring in wireless signals received by the two or more signal receivers;
searching for the specified operation and the intelligent device for performing the specified operation based on the order and the predetermined characteristic sample; and
sending a triggering signal for the intelligent device to perform the specified operation.

11. The method according to claim 1, wherein the method is performed by an intelligent household device or a server, and the intelligent household device comprises the receiving device and has wireless communication function;
the signal source is an electronic device having functions same with that of the intelligent household device, and the first wireless signal has functions of completing information transmission with the intelligent household device.

12. An apparatus, comprising:
a processor;
a memory for storing instructions that cause the processor to perform actions including;
obtaining a first signal quality of a first wireless signal received by a receiving device and sent by a signal source, the first wireless signal being transmitted by the signal source via a wireless signal field and in a form of a broadcast message or a point-to-point message that carries an identification including media access control address of the signal source;
calculating a first signal quality of the first wireless signal;
determining whether the first signal quality of the first wireless signal is within a predetermined signal quality range during a certain period;
obtaining a signal quality characteristic of the first signal quality if it is determined that the first signal quality of the first wireless signal is within the predetermined signal quality range during the certain period;
determining whether the signal quality characteristic matches with a predetermined characteristic sample; and
triggering an intelligent device to perform a specified operation if the signal quality characteristic matches with the predetermined characteristic sample based on a correspondence relationship between the predetermined characteristic sample and a combination of the specified operation and the identification that identifies the target device.

13. The apparatus according to claim 12, wherein to the actions further comprise:
obtaining a second signal quality of a second wireless signal sent by the signal source and received by the receiving device during a sample setting period before the first obtaining module obtains the first signal quality of the first wireless signal, wherein the sample setting period is a period of time specified to set the predetermined characteristic sample;
generating a signal quality characteristic spectrum based on the second signal quality of the second wireless signal, wherein the signal quality characteristic spectrum is configured to indicate a signal quality corresponding to each time during the sample setting period; and
setting the predetermined characteristic sample based on the signal quality characteristic spectrum.

14. The apparatus according to claim 13,
wherein the sample setting period is a period of time with a first time as a start time and a predetermined length; or the sample setting period is a period of time with a first time as a start time and a second time as an end time, and
wherein the first time is a time of receiving an operation for starting to set the predetermined characteristic sample, and the second time is a time of receiving an operation for stopping setting the predetermined characteristic sample.

15. The apparatus according to claim 12, wherein the actions further comprise:
  searching for the specified operation and a target device for performing the specified operation based on the predetermined characteristic sample; and
  triggering the target device to perform the specified operation.

16. The apparatus according to claim 12, wherein the specified signal source comprises two or more signal sources disposed adjacent to each other, and the actions further comprise:
  obtaining the signal quality characteristics of the first signal quality of wireless signals received by the receiving device and sent by the two or more signal sources if it is determined that disturbances occur simultaneously in the first signal quality of the wireless signals.

17. The apparatus according to claim 12, wherein the receiving device comprises two or more signal receivers and the actions further comprise:
  determining an order of disturbances occurring in the first signal quality of wireless signals received by the two or more signal receivers;
  for the specified operation and a target device for performing the specified operation based on the order and the predetermined characteristic sample; and
  triggering the target device to perform the specified operation.

18. The apparatus according to claim 12, wherein the apparatus further comprises the receiving device and has wireless communication function;
  the signal source is an electronic device having functions same with that of the intelligent household device, and the first wireless signal has functions of completing information transmission with the intelligent household device.

19. A system, comprising:
  a receiving device;
  a signal source; and
  a device for triggering a specified operation;
  wherein the device comprises:
  a processor; and
  a memory for storing instructions executable by the processor,
  wherein the processor is configured to cause the device to perform:
  obtaining a first signal quality of a first wireless signal received by the receiving device and sent by a specified signal source, the first wireless signal being transmitted by the signal source via a wireless signal field and in a form of a broadcast message or a point-to-point message that carries an identification including media access control address of the signal source;
  calculating a first signal quality of the first wireless signal;
  determining whether the first signal quality of the first wireless signal is within a predetermined signal quality range during a certain period;
  obtaining a signal quality characteristic of the first signal quality if it is determined that the first signal quality of the first wireless signal is within the predetermined signal quality range during the certain period;
  determining whether the signal quality characteristic matches with a predetermined characteristic sample; and
  triggering a target device to perform the specified operation if the signal quality characteristic matches with the predetermined characteristic sample based on a correspondence relationship between the predetermined characteristic sample and a combination of the specified operation and the identification that identifies the target device.

20. The system of claim 19, wherein the device for triggering a specified operation is a part of the receiving device.

21. The system of claim 19, wherein the device for triggering a specified operation is a device separate from the receiving device.

* * * * *